United States Patent
Larsen et al.

(10) Patent No.: US 10,063,174 B2
(45) Date of Patent: Aug. 28, 2018

(54) SYSTEM AND METHOD FOR CONTROLLING A NEGATIVE SEQUENCE CURRENT IN A WIND TURBINE GENERATOR

(71) Applicant: General Electric Company, Schenectady, NY (US)

(72) Inventors: Einar Vaughn Larsen, Charlton, NY (US); Wei Ren, Niskayuna, NY (US); Dustin Howard, Atlanta, GA (US); Alfredo Sebastian Achilles, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 15/230,536

(22) Filed: Aug. 8, 2016

(65) Prior Publication Data

US 2018/0041154 A1   Feb. 8, 2018

(51) Int. Cl.
| | |
|---|---|
| *H02P 9/10* | (2006.01) |
| *H02P 9/00* | (2006.01) |
| *F03D 9/00* | (2016.01) |
| *F03D 9/25* | (2016.01) |
| *H02K 7/18* | (2006.01) |

(52) U.S. Cl.
CPC ............... *H02P 9/10* (2013.01); *F03D 9/003* (2013.01); *F03D 9/25* (2016.05); *H02K 7/183* (2013.01); *H02P 9/007* (2013.01)

(58) Field of Classification Search
CPC . H02P 9/007; H02P 9/10; H02K 7/183; F03D 9/25; F03D 9/003
See application file for complete search history.

(56) References Cited

U.S. PATENT DOCUMENTS

| | | | |
|---|---|---|---|
| 9,702,908 B2* | 7/2017 | Gupta | ............... G01R 19/16533 |
| 2007/0177314 A1* | 8/2007 | Weng | ..................... H02P 9/007 |
| | | | 361/20 |

(Continued)

OTHER PUBLICATIONS

Nian, H., et al., "Voltage Imbalance Compensation for Doubly Fed Induction Generator Using Direct Resonant Feedback Regulator," IEEE Transactions on Energy Conversion, vol. 31, No. 2, pp. 614-626 (Jun. 1, 2016).

(Continued)

*Primary Examiner* — Sean Gugger
(74) *Attorney, Agent, or Firm* — Dority & Manning, P.A.

(57) ABSTRACT

The present disclosure is directed to a system and method for controlling an electrical power system connected to a power grid. The method includes determining, via a negative sequence regulator programmed in a controller of the electrical power system, a negative sequence component of at least one electrical condition of the electrical power system. Further, the method includes determining a desired current response based on the negative sequence component of the at least one electrical condition of the electrical power system. Thus, the method also includes determining a control command for the power converter as a function of the desired current response so as to achieve a desired relationship between a voltage condition in the power grid and the negative sequence component of the electrical condition of the electrical power system.

15 Claims, 7 Drawing Sheets

(56) References Cited

U.S. PATENT DOCUMENTS

| | | | | |
|---|---|---|---|---|
| 2010/0052322 | A1* | 3/2010 | Fortmann | F03D 7/0272 290/44 |
| 2011/0215775 | A1* | 9/2011 | Engelhardt | H02J 3/26 323/205 |
| 2012/0119712 | A1* | 5/2012 | Virtanen | H02P 9/007 322/22 |
| 2012/0299305 | A1* | 11/2012 | Brogan | H02J 3/386 290/55 |
| 2013/0057297 | A1* | 3/2013 | Cheng | H02M 1/32 324/548 |
| 2013/0121046 | A1* | 5/2013 | Xue | H02J 3/00 363/74 |
| 2013/0234435 | A1* | 9/2013 | Wagoner | H02P 9/007 290/44 |
| 2013/0264824 | A1* | 10/2013 | Gupta | F03D 7/0284 290/44 |
| 2013/0320936 | A1* | 12/2013 | Deng | H02P 9/00 322/27 |
| 2014/0138949 | A1* | 5/2014 | El Moursi | H02P 9/10 290/44 |
| 2014/0307488 | A1* | 10/2014 | Brogan | H02M 5/4585 363/35 |
| 2015/0300320 | A1* | 10/2015 | Diedrichs | H02J 3/386 290/44 |

OTHER PUBLICATIONS

Extended European Search Report and Opinion issued in connection with corresponding EP Application No. 17184804.7 dated Dec. 14, 2017.

* cited by examiner

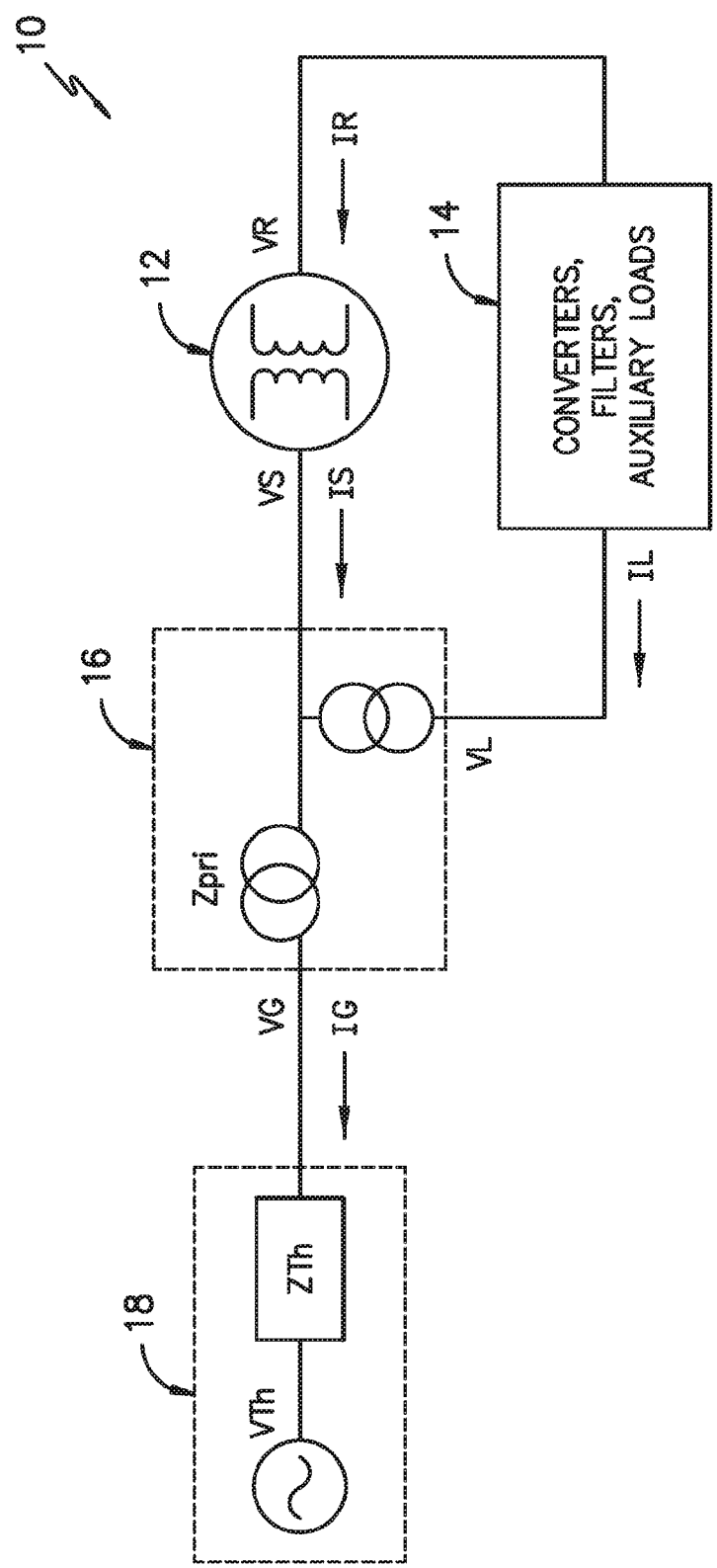
FIG. -1-

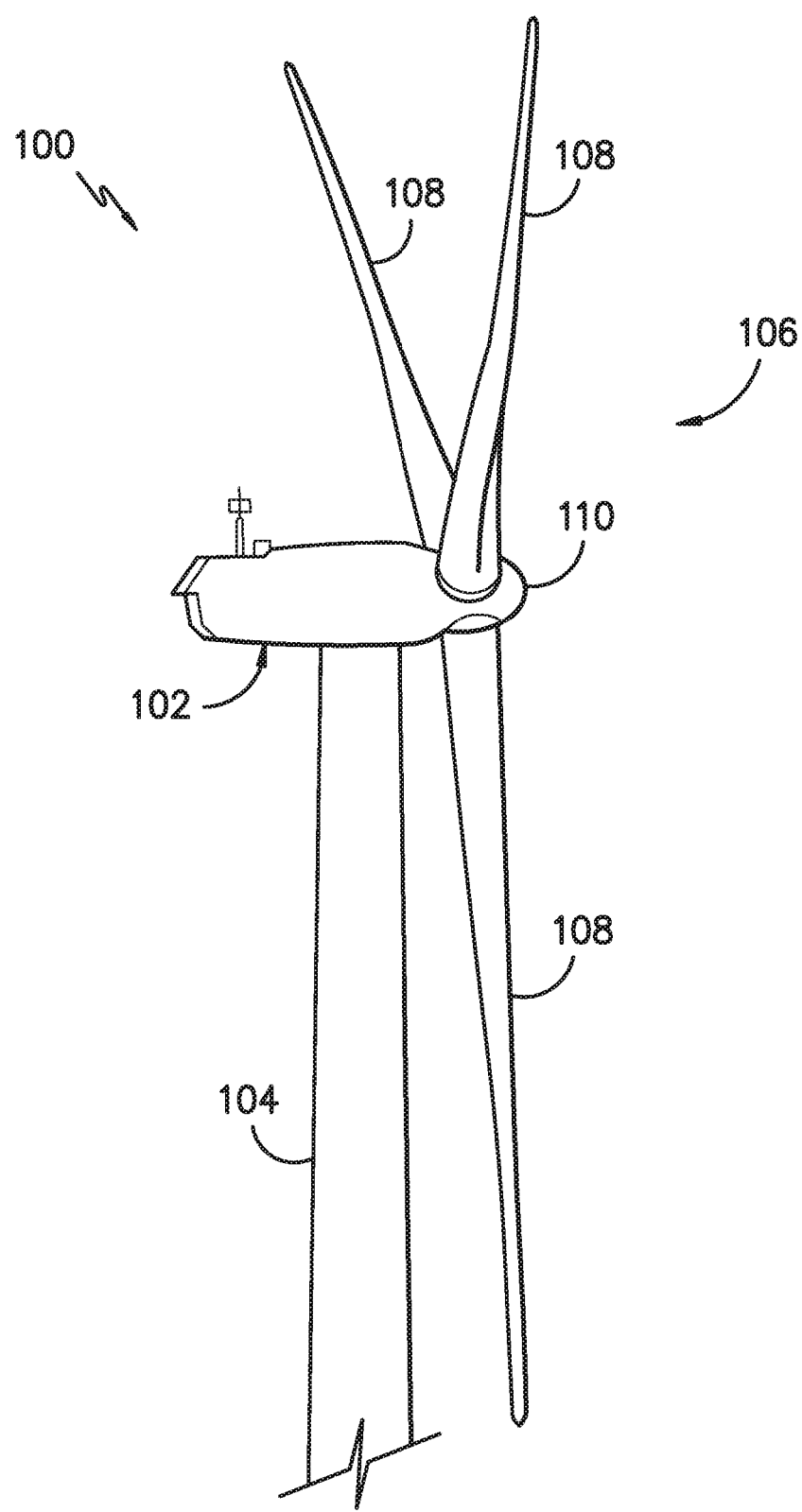
FIG. -2-

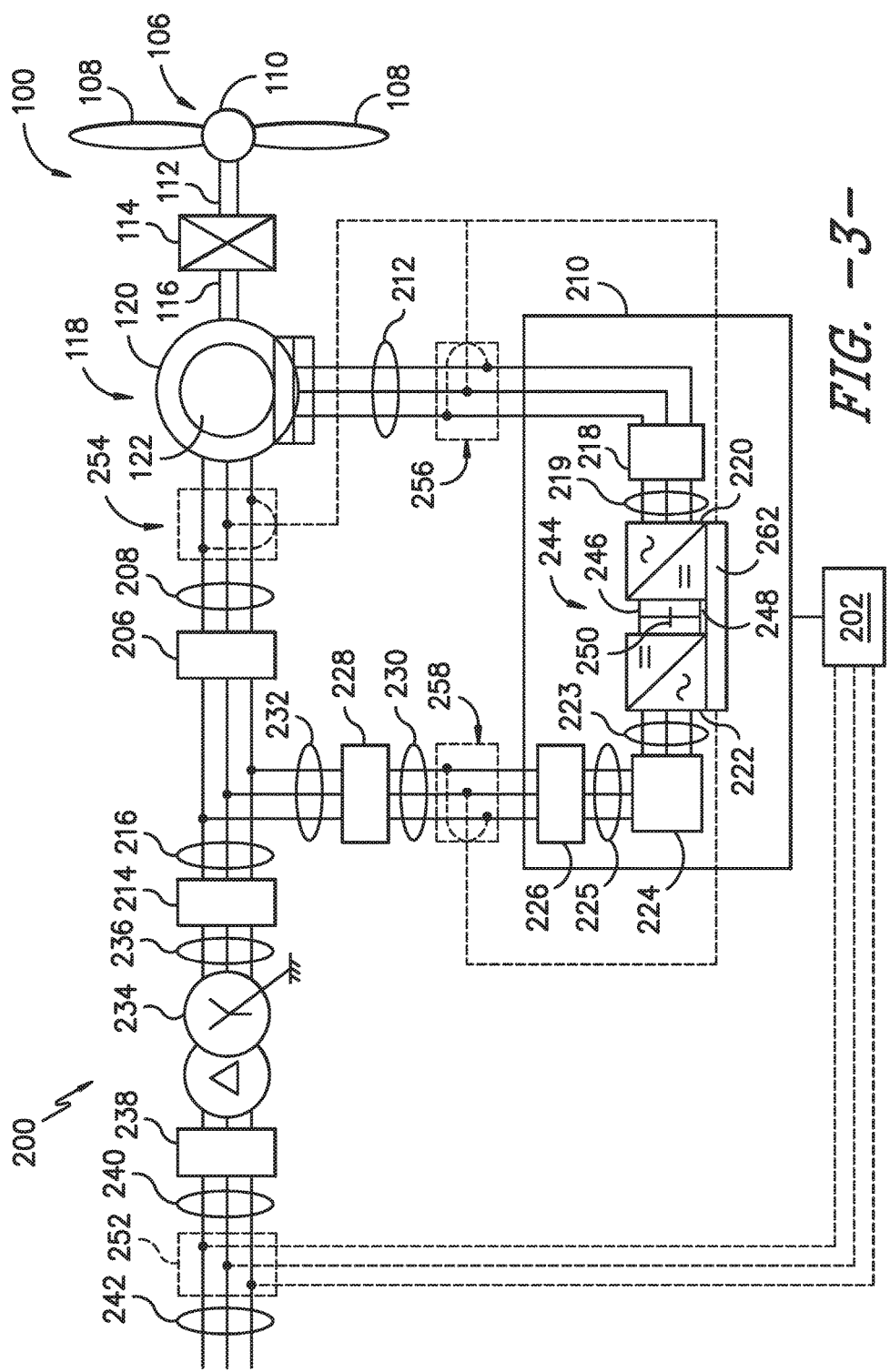
FIG. -3-

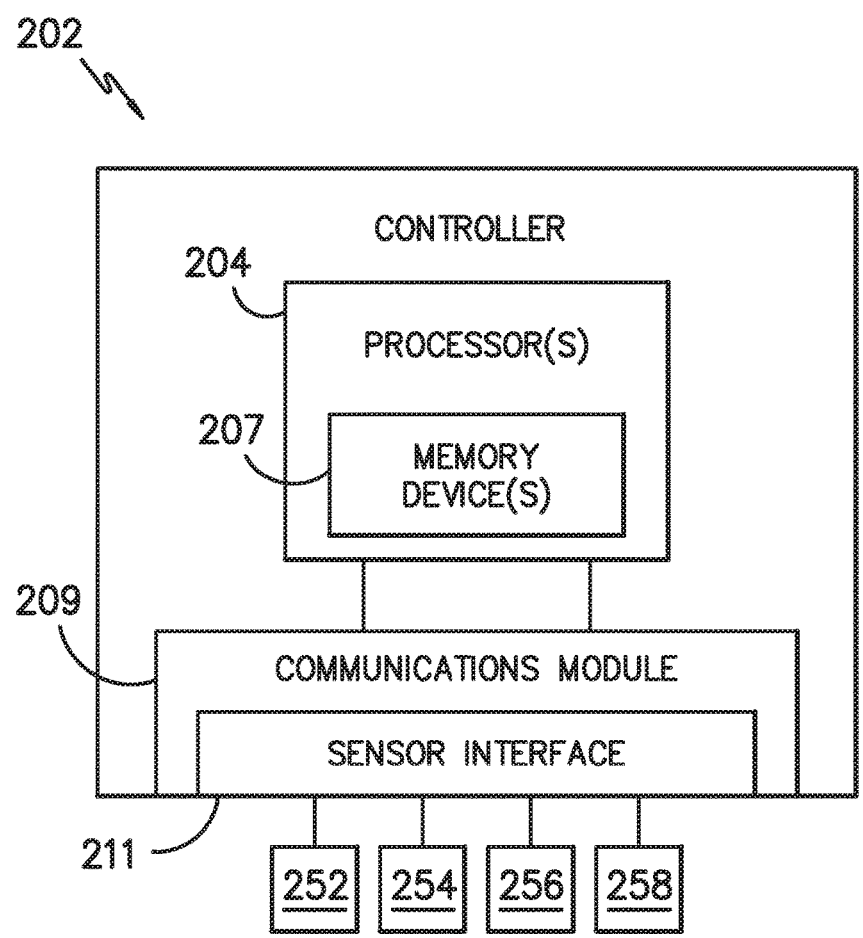
FIG. -4-

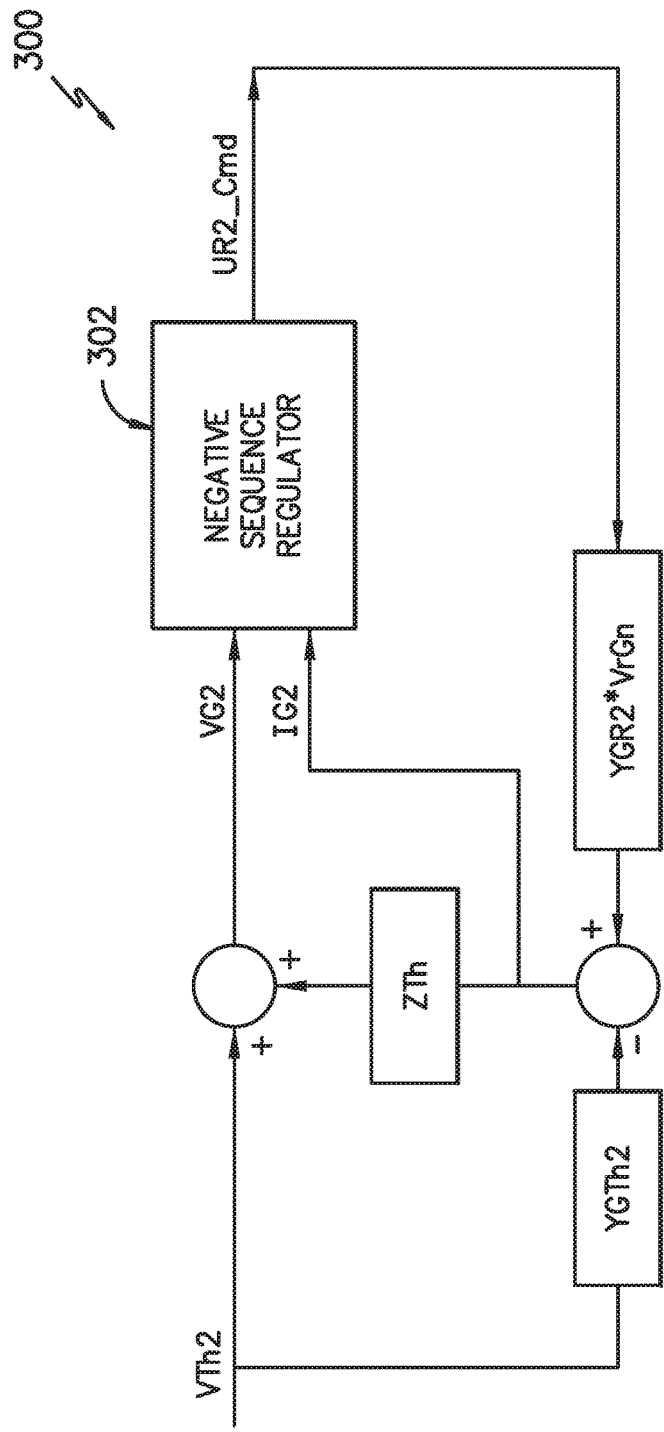
FIG. -5-

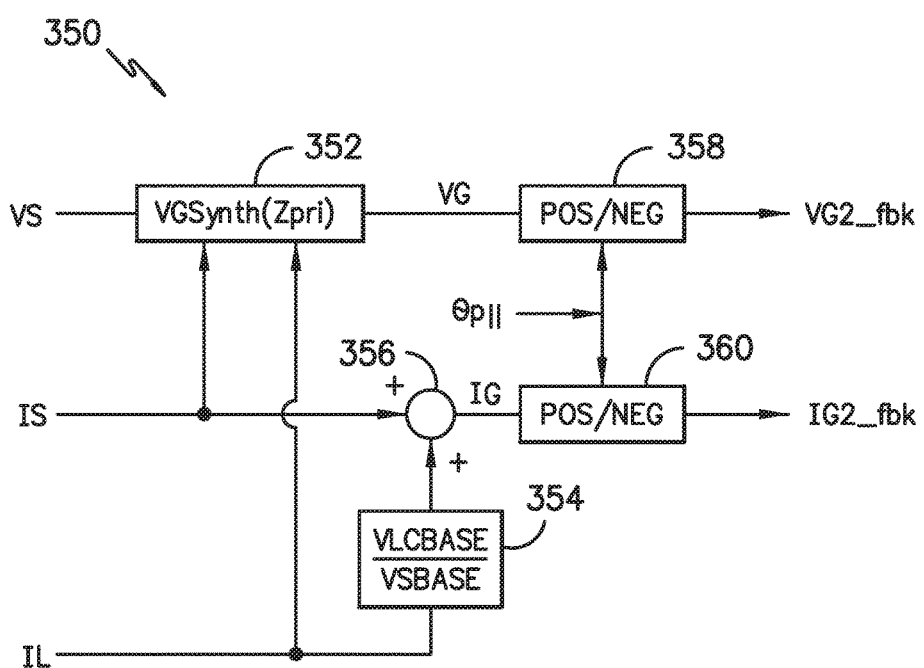
FIG. -6-

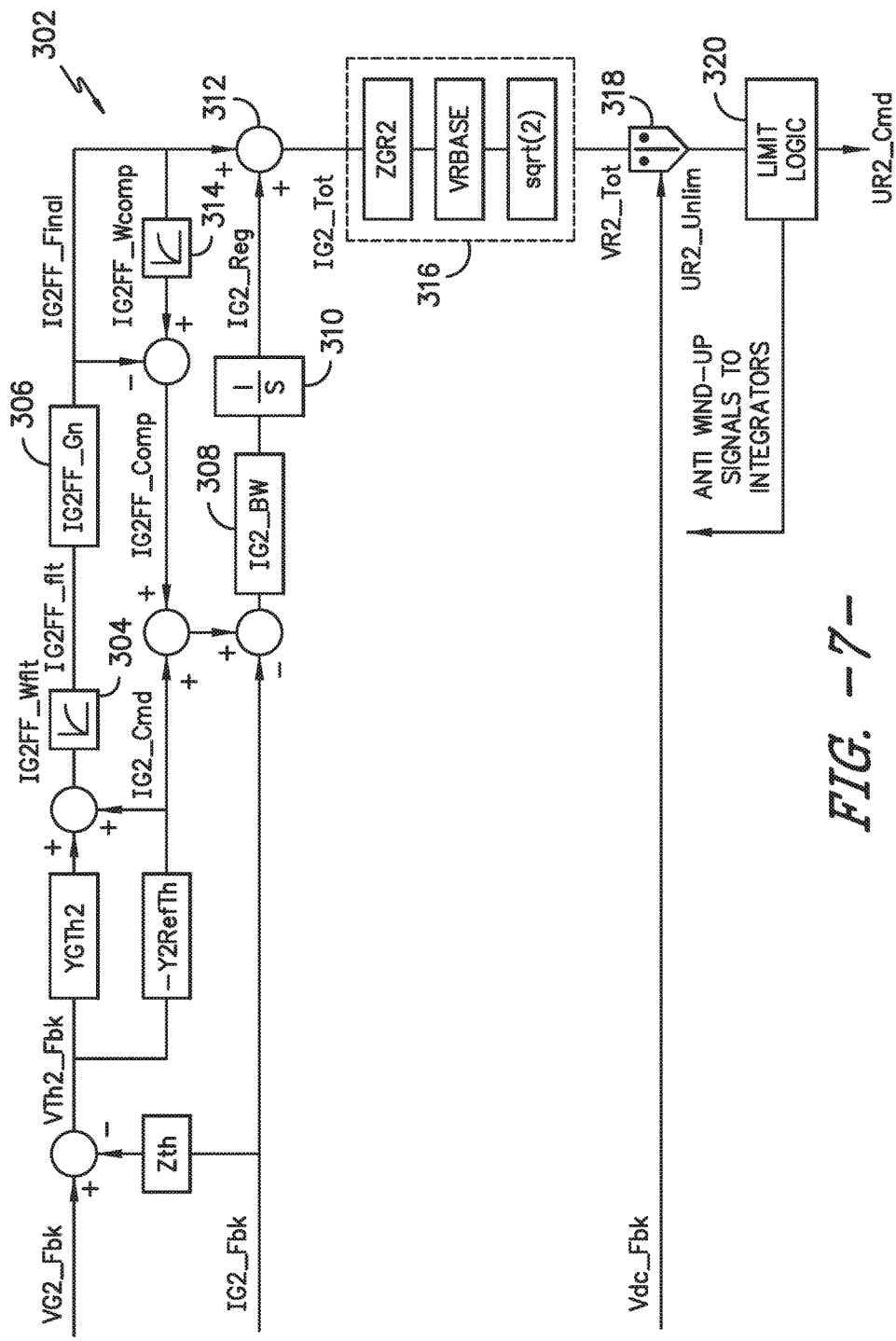
FIG. -7-

SYSTEM AND METHOD FOR CONTROLLING A NEGATIVE SEQUENCE CURRENT IN A WIND TURBINE GENERATOR

FIELD OF THE INVENTION

The present disclosure relates generally to wind turbines and, more particularly, to a system and method for controlling a negative sequence current in a generator of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

In many wind turbines, the generator may be electrically coupled to a bi-directional power converter that includes a rotor-side converter joined to a line-side converter via a regulated DC link. Further, wind turbine power systems may include a variety of generator types, including but not limited to a doubly-fed asynchronous generator (DFAG).

DFAG operation is typically characterized in that the rotor circuit is supplied with current from a current-regulated power converter. As such, the power converter can provide nearly instantaneous regulation of its output currents with respect to the grid frequency. Under steady operating conditions, the rotor-side converter controls the magnitude and phase of currents in the rotor circuit to achieve desired values of electromagnetic torque. Reactive power flow into the line-connected stator terminals of the generator can also be controlled.

A simplified, schematic diagram of one embodiment of a main circuit 10 of a DFAG is illustrated in FIG. 1. As shown, the main circuit 10 includes a generator 12 connected to a power converter 14 (as well as any required power electronics) and a transformer 16 that is connected to a power grid 18. More specifically, as shown, the connection to the power grid 18 is at the high side of the transformer 16, where the voltage and current are indicated as VG and IG, respectively. Further, the power grid 18 is illustrated conceptually as a Thevenin (Th) equivalent. As used herein, the Thevenin equivalent generally refers to an equivalent voltage source in series connection with an impedance that is an approximation of a complex, non-linear grid that constantly changes based on the number of wind turbines, external grid status, etc. The Thevenin impedance ZTh varies with the number of wind turbines in operation and the status of the transmission system beyond the wind park.

When an imbalance occurs in the power grid 18, a negative-sequence component of voltage appears in the Thevenin voltage, which is represented in FIG. 1 as VTh. Such a negative sequence component of voltage can have a negative impact on the power grid 18 as well as the wind turbine power system. As such, it would be advantageous to provide a control methodology for reacting to this negative sequence component of voltage so as to offset any negative impacts.

Prior art systems often design the control system to attenuate the negative sequence component of current flowing in the equipment as a result of the imbalance in the power grid 18. While this reduces the duty on the equipment, it is not necessarily the best for the power system to which it is connected. As such, an improved system and method for providing negative-sequence control that causes the wind turbine to follow a prescribed relationship between the voltage VG and the current IG would be advantageous. For example, a negative-sequence control scheme that causes the relationship between the voltage VG and the current IG to be inductive nature, similar to how a directly-connected synchronous machine would react, would be desirable.

Thus, the present disclosure is directed to controlling a negative sequence current in the DFAG of the wind turbine that addresses the aforementioned issues.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling an electrical power system connected to a power grid. The electrical power system has a power converter electrically coupled to a generator. The method includes determining, via a negative sequence regulator programmed in a controller of the electrical power system, a negative sequence component of at least one electrical condition of the electrical power system. Further, the method includes determining a desired current response based on the negative sequence component of the at least one electrical condition of the electrical power system. Thus, the method also includes determining a control command for the power converter as a function of the desired current response so as to achieve a desired relationship between a voltage condition in the power grid and the negative sequence component of the electrical condition of the electrical power system.

In one embodiment, the control command may include a modulation index command for the power converter. In another embodiment, the method may also include determining the desired current response as a function of a desired negative sequence admittance characteristic of the electrical power system.

In further embodiments, the method may include estimating, via the negative sequence regulator programmed in the controller of the electrical power system, a negative sequence component of the voltage condition in the power grid as a function of the negative sequence component of the electrical condition of the generator and a grid parameter. In addition, the method may include determining at least one of a predictor current or a regulator current as a function of the estimated negative sequence component of the voltage condition in the power grid and the desired current response, determining a current output based on at least one of the predictor current or the regulator current, and determining the control command for the power converter as a function of the current output.

In another embodiment, the step of determining the regulator current may include applying a gain to an error signal representative of a difference between the desired current response and a measured current response, and integrating, via an integrator, the error signal to obtain the regulator current. In additional embodiments, the step of determining the predictor current may include multiplying the estimated negative sequence component of the voltage condition in the power grid and an uncompensated negative sequence admittance of the electrical power system, summing the multiplied value with the desired current response, filtering the summed value via a filter at a predetermined bandwidth, and applying a gain to the filtered value to obtain the predictor current.

In yet another embodiment, the method may include generating a compensation current based on the predictor current and a filtered compensator value.

In still further embodiments, the method may include converting the current output to a voltage value and determining the modulation index command for the power converter as a function of the voltage value.

In additional embodiments, the method may include dividing the voltage value by a DC link voltage from the power converter to obtain the modulation index command. In further embodiments, the method may include limiting the modulation index command for the power converter such that the modulation index command maintains relative values of the signal and does not cause windup.

In particular embodiments, the electrical condition(s) of the power converter may include a voltage or a current of a stator of the generator, a rotor of the generator, a line-side converter of the power converter, a transformer of the electrical power system, or any other electrical conditions of the power system.

In another embodiment, the generator of the electrical power system may include a doubly-fed asynchronous generator (DFAG). Further, in certain embodiments, the electrical power system may be part of a wind turbine power system.

In another aspect, the present disclosure is directed to an electrical power system. The electrical power system includes a transformer connected to a power grid, a generator electrically coupled to the transformer, the generator comprising a rotor and a stator, a power converter electrically coupled to the transformer and the generator, and a controller configured to control the electrical power system. Further, the controller includes a negative sequence regulator programmed therein. The negative sequence regulator is configured to perform one or more operations, including but not limited to determining a negative sequence component of at least one electrical condition of the electrical power system, estimating a negative sequence component of a voltage condition in the power grid as a function of the negative sequence component of the electrical condition of the generator and a grid parameter, determining a desired current response based on the negative sequence component of the voltage condition in the power grid, and determining a control command for the power converter as a function of the desired current response so as to achieve a desired relationship between the negative sequence component of the voltage condition in the power grid and the negative sequence component of the electrical condition of the electrical power system. It should be understood that the electrical power system may further include any of the additional features as described herein.

In yet another aspect, the present disclosure is directed to a method for reacting to a negative sequence voltage occurring in a power grid. The method includes determining, via a negative sequence regulator programmed in a controller of an electrical power system, a negative sequence component of at least one electrical condition of the electrical power system. Further, the method includes estimating, via the negative sequence regulator, a negative sequence component of a voltage condition in the power grid as a function of the negative sequence component of the electrical condition of the generator and a grid parameter. The method also includes determining a desired current response based on the negative sequence component of the voltage condition in the power grid. Further, the method includes determining at least one of a predictor current and a regulator current as a function of the estimated negative sequence component of the voltage condition in the power grid and the desired current response. In addition, the method includes determining a current output based on at least one of the predictor current and the regulator current. Thus, the method also includes determining a modulation index command for the power converter as a function of the current output so as to achieve a desired relationship between the negative sequence component of the voltage condition in the power grid and the negative sequence component of the electrical condition of the electrical power system. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified schematic diagram of one embodiment of a main circuit according to the present disclosure;

FIG. 2 illustrates a perspective view of a portion of one embodiment of a wind turbine according to the present disclosure;

FIG. 3 illustrates a schematic view of one embodiment of an electrical power system suitable for use with the wind turbine shown in FIG. 2;

FIG. 4 illustrates a block diagram of one embodiment of a controller suitable for use with the wind turbine shown in FIG. 2;

FIG. 5 illustrates a schematic diagram of one embodiment of a control scheme according to the present disclosure, particularly illustrating a negative sequence regulator;

FIG. 6 illustrates a schematic diagram of one embodiment of a control scheme for sensing and transducing measured electrical signals to negative sequence components according to the present disclosure; and FIG. 7 illustrates a detailed, schematic diagram of one embodiment of a negative sequence regulator according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for reacting to a negative sequence voltage occurring in a power grid. More specifically, the method includes determining, via a negative sequence regulator programmed in a controller of the electrical power system, a negative sequence component of at least one electrical condition of the electrical power system. Further, the method includes determining a desired current response based on the negative sequence component of the at least one electrical condition of the electrical power system. Thus, the method also includes determining a control command for the power converter as a function of the desired current response so as to achieve a desired relationship between a negative sequence component of the voltage condition in the power grid and the negative sequence component of the electrical condition of the electrical power system.

Referring now to the drawings, FIG. 2 illustrates a perspective view of a portion of an exemplary wind turbine 100 according to the present disclosure that is configured to implement the method as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring to FIG. 3, a schematic view of one embodiment of an electrical power system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, doubly-fed induction (asynchronous) generator (DFAG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical power system 200 may include a wind turbine controller 202 configured to control any of the components of the wind turbine 100 and/or implement the method steps as described herein. For example, as shown particularly in FIG. 4, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 3. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 4, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 3, the generator stator 120 may be electrically coupled to a stator synchronizing switch 206 via a stator bus 208. In one embodiment, the generator rotor 122 may be electrically coupled to a bi-directional power conversion assembly 210 or power converter via a rotor bus 212. Alternatively, the generator rotor 122 may be electrically coupled to the rotor bus 212 via any other device that facilitates operation of electrical power system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical power system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical power system 200 that facilitates operation of electrical power system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line feedback signals, line-side converter feedback signals, rotor-side converter feedback signals, or stator feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Referring now to FIGS. 5-7, various illustrations are provided to further describe the systems and methods of the present disclosure. For example, FIG. 5 illustrates a simplified, schematic diagram of one embodiment of a control scheme 300 according to the present disclosure, particularly illustrating a negative sequence regulator 302; FIG. 6 illustrates a schematic diagram of one embodiment of a control scheme 350 for sensing and transducing measured electrical signals to negative sequence components; and FIG. 7 illustrates a detailed, schematic diagram of one embodiment of the negative sequence regulator 302 according to the present disclosure.

Referring particularly to FIG. 5, the control scheme 300 includes a negative sequence regulator 302 applied to the power converter 210. As shown generally in the figures, the variable names including a "2" represent the negative-sequence component of the associated variable. For example, VTh2 represents the negative-sequence component of the grid Thevenin voltage VTh and so on. Further, UR2_Cmd represents the negative-sequence component of the modulation index added to the modulation index contributions from other controls, e.g. the main rotor current regulator. As such, the signals illustrated in the figures represent phasor quantities synchronized with the negative-sequence reference frame. Synchronization is based on the positive-sequence phase locked loop using double angle for demodulation and modulation. In addition, the voltage at the power grid (VG) and the current into the grid (IG) are assumed to be measured and transduced to extract the negative-sequence components (VG2 and IG2), which is further discussed with reference to FIG. 6 below.

The negative sequence component of the grid voltage VTh2 and the control command UR2_Cmd contribute independently to the measured IG2. The net effect of the system impedances and control reactions can be represented via two admittance terms, namely YGTh2 and YGR2. The admittances YGTh2 and YGR2 are functions of the impedances of the machine, the transformer 234, filters, external grid (ZTh), etc. Further, the admittances YGTh2 and YGR2 are a function of the main current regulators of the rotor-side and line-side converters 220, 222 and the DC voltage regulator. As such, the admittances YGTh2 and YGR2 vary with operating conditions, such as speed and flux in the machine. This variation can be managed by understanding such relationships and selecting a compromise value for the fixed setting of the admittances. Equations (1) and (2) provide one embodiment of methods for calculating the admittances YGTh2 and YGR2 from tests and then compensating for ZTh. For example, the admittance terms represent the net effect of the inherent machine impedance (including controls) in series with ZTh.

$$ZGTh2=1/YGTh2=ZGTh2o+ZTh \quad \text{Equation (1)}$$

$$ZGR2=1/YGR2=ZGR2o+ZTh \quad \text{Equation (2)}$$

where
ZGTh2o is equal to 1/YGTh2 when ZTh=0, and
ZGR2o is equal to 1/YGR2 when ZTh=0.

Referring now to FIG. 6, a schematic diagram of one embodiment of a control scheme 350 for sensing and transducing measured electrical signals to negative sequence components is illustrated. As shown, the electrical signals or conditions may include a voltage or a current of a stator of the generator (VS, IS), a voltage or a current of a rotor of the generator (VR, IR), a voltage or a current of a line-side converter of the power converter (VL, IL), a voltage or a current of a transformer of the electrical power system (VG, IG), or any other electrical conditions of the power system. For example, in the illustrated embodiment, the stator voltage VS, the stator current IS, and the line-side converter current IL are being transduced. More specifically, the stator voltage VS, the stator current IS, and the line-side converter current IL are used to estimate the voltage at the high-side of the transformer VG at block 352. Further, since the stator current IS and the line-side converter current IL are at different voltage amplitudes, block 354 provides a turn ratio for the line-side converter current IL such that the two currents can be summed at 356. The voltage at the high-side of the transformer VG and the summed currents can then be fed to one or more positive/negative (pos/neg) discriminator(s) 358, 360. In addition, as shown, a phase locked loop angle $\theta_{pll}$ can be factored into the pos/neg discriminator(s) 358, 360. Further, as shown, the output of the positive/negative (pos/neg) discriminator(s) 358, 360 are equal to VG2_fbk and IG2_fbk, respectively. It should also be understood that VG2_fbk and IG2_fbk may be measured directly and FIG. 6 is provided for illustrative purposes only.

Referring now to FIG. 7, a detailed, schematic diagram of one embodiment of the negative sequence regulator 302 according to the present disclosure is illustrated. As shown, the negative sequence regulator 302 is configured to determine a negative sequence component (e.g. VG2_Fbk, IG2_Fbk) of at least one electrical condition (e.g. VG, IG, VS, IS, VR, IR, VL, IL) of the electrical power system 200. For example, as shown, the inputs to the negative sequence regulator 302 correspond to the negative sequence component of the grid voltage and current (e.g. VG2_Fbk, IG2_Fbk). As such, the negative sequence regulator 302 is configured to estimate a negative sequence component of a voltage condition in the power grid 242 (e.g. VTh2_Fbk) as a function of the negative sequence component of the electrical condition of the generator (VG2_Fbk, IG2_Fbk) and a grid impedance (ZTh), as shown by Equation (3) below:

$$VTh2\_Fbk=VG2\_Fbk-ZTh*IG2\_Fbk \quad \text{Equation (3)}$$

Further, the negative sequence regulator 302 is configured to determine a regulator current (IG2_Reg) as a function of the estimated negative sequence component of the voltage condition in the power grid 242 (VTh2_Fbk) and a desired current response (IG2_Cmd). In addition, in particular embodiments, the negative sequence regulator 302 may be configured to determine the desired current response IG2_Cmd as a function of the estimated negative sequence component of the voltage condition in the power grid 242 VTh2_Fbk and a desired negative sequence admittance characteristic of the electrical power system (Y2RefTh). The reference for IG2 is determined based on the measured value of VTh2, the value of ZTh used in computing VTh2, and the desired admittance as seen from VG looking into the wind turbine transformer 234. As such, when the negative sequence regulator 302 forces the actual IG2 currents to equal the reference, the effect of ZTh is cancelled. However, the use of a remote voltage closer to the true source is to reduce interactions with the grid 242 that can lead to instability, thereby permitting faster response. More specifically, calculating the desired current response IG2_Cmd can be better understood with reference to Equations (4)-(5) as shown below:

$$IG2\_Cmd=-VTh2\_Fbk*Y2RefTh \quad \text{Equation (4)}$$

$$Y2RefTh=Y2Ref/(1+Y2Ref*ZTh) \quad \text{Equation (5)}$$

where
Y2Ref is the desired admittance looking into the system from VG, and
Y2RefTh is the desired admittance looking into the system from VTh.

For a purely inductive characteristic at VG and by assuming a purely inductive value for ZTh, Equations (6)-(8) below further simplify Equations (4) and (5) above.

$$Y2Ref=jB2ref \quad \text{Equation (6)}$$

$$ZTh=jXTh \quad \text{Equation (7)}$$

$$Y2RefTh=jB2ref/(1-B2Ref*XTh) \quad \text{Equation (8)}$$

where
B2Ref is a negative number for inductive.

Such a requirement is generally provided as a gain representing the magnitude of IG2 to be supplied as a function of the voltage at VG2, in per unit. The value of B2Ref follows from this gain. If the control is implemented in per unit then Zbase is one, and can be represented as shown in below in Equations (9) and (10).

$$IG2\_Spec = IG2\_Gn(VG2) * VG2 \qquad \text{Equation (9)}$$

$$B2Ref = -IG2\_Gn/Zbase \qquad \text{Equation (10)}$$

Referring still to FIG. 7, the negative sequence regulator 302 is configured to determine the regulator current (IG2_Reg) by applying a gain (IG2_BW) to an error signal representative of a difference between the desired current response (IG2_Cmd) and a measured current response and integrating, via an integrator 310, the error signal to obtain the regulator current IG2_Reg. More specifically, the structure is to create a signal IG2_Reg that would be processed to create approximately the same amount of IG2_Fbk. With this structure, the gain in the corrector path IG2_BW represents its bandwidth.

Further, the negative sequence regulator 302 is configured to determine a predictor current (IG2FF_Final) as a function of the estimated negative sequence component of the voltage condition in the power grid (VTh2_Fbk). As such, the predictor current IG2FF_Final provides a value for the regulator output that would, if perfect, bring the actual current to the commanded value. This is the feedforward component of the control command UR2_Cmd. More specifically, in certain embodiments, the negative sequence regulator 302 may determine the predictor current (IG2FF_Final) by multiplying the estimated negative sequence component of the voltage condition in the power grid 242 (VTh2_Fbk) and an uncompensated negative sequence admittance of the electrical power system 200 (YGTh2), summing the multiplied value with the desired current response (IG2_Cmd), filtering the summed value (IG2FF_WFlt) via a filter 304 at a predetermined bandwidth (IG2FF_Flt). In certain embodiments, the filter 304 (e.g. a low-pass filter) is provided in the structure as a means to attenuate high-frequency noise. As such, the filter bandwidth IGFF_Wfilt may be high, e.g. above 300 r/s. Further, as shown, the negative sequence regulator 302 may limit the filtered value (IG2FF_Flt) at block 306 via a gain (IG2FF_Gn) to obtain the predictor current IG2FF_Final. In particular embodiments, the gain IG2FF_Gn would be set to a value less than unity, e.g. 0.8, and adjusted as needed.

In additional embodiments, the negative sequence regulator 302 may also be configured to generate a compensation current (IGFF_Comp) to reduce the tendency of the predictor to overreact. Further, as shown, the negative sequence regulator 302 may be configured to generate a compensator value (IGFF_WComp) via a filter 314. More specifically, in certain embodiments, this function may use a low-pass filter on the final feed-forward output (IG2FF_Wcomp) to estimate the delay before seeing the reaction in IG2_Fbk. This time delay would be seen in the tests performed to measure YGR2. As such, the negative sequence regulator 302 may be configured to generate the compensation current IGFF_Comp based on the predictor current IG2FF_Final and the filtered compensator value (IGFF_WComp).

As such, the negative sequence regulator 302 is further configured to determine a current output (IG2_Tot) based on the predictor current IG2FF_Final and the regulator current (IG2_Reg). More specifically, as shown at 312, the negative sequence regulator 302 may be configured to determine the current output IG2_Tot by summing the predictor current IG2FF_Final and the regulator current IG2_Reg, which represents the value of IG2 that the regulator is asking for, assuming the subsequent processing is perfect.

Thus, the negative sequence regulator 302 is also configured to determine a control command (UR2_Cmd) for the power converter 210 as a function of the current output (IG2_Tot) so as to achieve a desired relationship between the negative sequence component of the voltage condition in the power grid (VTh2_Fbk) and the negative sequence component of the electrical condition of the generator 118 (IG2_Fbk), e.g. the negative sequence component of current. For example, in one embodiment, the control command UR2_Cmd may include a modulation index command (UR2_Cmd) for the power converter 210.

In addition, as shown, the negative sequence regulator 302 may be further configured to convert the current output IG2_Tot to a voltage value (VR2_Tot) via one or more post-processing steps as shown at 316. For certain embodiments, the subsequent processing is completed via a complex gain ZGR2, which is an estimate of the inverse of YGR2. Further, the negative sequence regulator 302 is configured to determine the modulation index command UR2_Cmd for the power converter 210 as a function of the voltage value VR2_Tot.

In particular embodiments, a phase trim feature can be included in the calculation of ZGR2 to allow for tuning as the phase of this function can be more important to stability than the gain. More specifically, ZGR2 can be calculated according to Equation (11) below:

$$ZGR2 = 1/YGR2\_avg * \exp(jThetaZGR2trim) \qquad \text{Equation (11)}$$

where
YGR2_avg is the average of YGR2 measurements over the desired operating range, and
ThetaZGR2trim is the angle to shift from YGR2_avg.

Still referring to FIG. 7, as shown at 318, the negative sequence regulator 302 may also be configured to divide the voltage value VR2_Tot by a DC link voltage (Vdc_Fbk) of the power converter 210 to obtain the modulation index command (UR2_Cmd). For example, in certain embodiments, the negative sequence regulator 302 may convert the current output IG2_Tot to the appropriate modulation index by using ZGR2 and/or by dividing by VrGn, which represents a change in units from the modulation index to per-unit voltage, which depends on the measured DC voltage and the base rotor voltage (i.e. line to line RMS value), as shown in Equation (12) below:

$$VrGn = Vdc\_Fbk/(\text{sqrt}(2) * VRBASE) \qquad \text{Equation (12)}$$

In further embodiments, the negative sequence regulator 302 may also include a limit logic 320 configured to limit the modulation index command UR2_Cmd for the power converter 210 such that the modulation index command UR2_Cmd does not cause windup. More specifically, the above steps create can create an unlimited value of the modulation index command (UR2_Unlim). If the magnitude of UR2_Unlim exceeds the limit allocated for negative-sequence component then limiting is required. As such, the limit logic 320 is configured to restrict the components of UR2 such that the phase relationship of the real and imaginary components is retained. More specifically, each of the signals illustrated in FIGS. 5-7 represent complex numbers having real and imaginary components. As such, the limit logic 320 is configured to limit the modulation index command for the power converter 210 such that the modulation index command maintains the relative values of the two components of the signal (i.e. real and imaginary). In addition, to prevent windup, the limit logic 320 may compute a factor that is used as a multiplier in appropriate locations. For example, in certain embodiments, the factor UR2LimFactor may be defined according to Equation (13) below:

$$UR2LimFactor=\min(1.0, UR2Lim/\sqrt{(UR2x\_Unlim^2+UR2y\_Unlim^2)})  \quad \text{Equation (13)}$$

This factor will be equal to one unless the magnitude of UR2_Unlim exceeds the limit UR2Lim. Otherwise, the factor will be less than one. Equation (14) below represents how the factor can be used:

$$UR2\_Cmd=UR2\_Unlim*UR2LimFactor \quad \text{Equation (14)}$$

For anti-windup of the integrators, the factor may be applied similarly to modify their outputs before executing the next pass, as shown in Equations (15) and (16) below:

$$IG2Reg=IG2Reg*UR2LimFactor \quad \text{Equation (15)}$$

$$IG2FF\_Filt=IG2FF\_Filt*UR2LimFactor \quad \text{Equation (16)}$$

As such, the present disclosure provides negative-sequence control that causes the electrical power system (e.g. the wind turbine power system 200 of FIG. 3) to follow a prescribed relationship between the voltage VG and the current IG.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an electrical power system connected to a power grid, the electrical power system having a power converter electrically coupled to a generator, the method comprising:

determining, via a negative sequence regulator programmed in a controller of the electrical power system, a negative sequence component of at least one electrical condition of the electrical power system;

determining a desired current response based on the negative sequence component of the at least one electrical condition of the electrical power system; and, estimating, via the negative sequence regulator, a negative sequence component of a voltage condition in the power grid as a function of the negative sequence component of the electrical condition of the electrical power system and a grid parameter;

determining a predictor current as a function of the estimated negative sequence component of the voltage condition in the power grid and the desired current response by multiplying the estimated negative sequence component of the voltage condition and an uncompensated negative sequence admittance of the electrical power system, summing the multiplied value with the desired current response, filtering the summed value via a filter at a predetermined bandwidth, and limiting the filtered value;

determining a current output based on the predictor current;

determining a control command for the power converter as a function of the current output so as to achieve a desired relationship between the voltage condition in the power grid and the negative sequence component of the electrical condition of the electrical power system.

2. The method of claim 1, wherein the control command comprises a modulation index command for the power converter.

3. The method of claim 1, further comprising determining the desired current response as a function of a desired negative sequence admittance characteristic of the electrical power system.

4. The method of claim 1, wherein determining the regulator current further comprises:

applying a gain to an error signal representative of a difference between the desired current response and a measured current response; and, integrating, via an integrator in the negative sequence regulator, the error signal to obtain the regulator current.

5. The method of claim 1, further comprising generating a compensation current based on the predictor current and a filtered compensator value.

6. The method of claim 1, further comprising converting the current output to a voltage value and determining a modulation index command for the power converter as a function of the voltage value.

7. The method of claim 6, further comprising dividing the voltage value by a DC link voltage from the power converter to obtain the modulation index command.

8. The method of claim 7, further comprising limiting the modulation index command for the power converter such that the modulation index command maintains relative values of the signal and does not cause windup.

9. The method of claim 1, wherein the at least one electrical condition of the electrical power system comprises at least one of a voltage or a current of a stator of the generator, a rotor of the generator, a line-side converter of the power converter, or a transformer of the electrical power system.

10. The method of claim 1, wherein the generator comprises a doubly-fed asynchronous generator (DFAG).

11. The method of claim 1, wherein the electrical power system is part of a wind turbine power system.

12. An electrical power system, comprising:

a transformer connected to a power grid;

a generator electrically coupled to the transformer, the generator comprising a rotor and a stator;

a power converter electrically coupled to the transformer and the generator; and, a controller configured to control the electrical power system, the controller comprising a negative sequence regulator programmed therein, the negative sequence regulator configured to:

determine a negative sequence component of at least one electrical condition of the electrical power system;

estimate a negative sequence component of a voltage condition in the power grid as a function of the negative sequence component of the electrical condition of the generator and a grid parameter;

determine a desired current response based on the negative sequence component of the voltage condition in the power grid;

determine a predictor current as a function of the estimated negative sequence component of the voltage condition in the power grid and the desired current response by multiplying the estimated negative sequence component of the voltage condition and an uncompensated negative sequence admittance of the electrical power system, summing the multiplied value with the desired current response, filtering the summed value via a filter at a predetermined bandwidth, and limiting the filtered value;

determine a current output based on the predictor current; and, determine a control command for the power converter as a function of the current output so as to achieve a desired relationship between the negative sequence component of the voltage condition in the power grid and the negative sequence component of the electrical condition of the electrical power system.

13. A method for reacting to a negative sequence voltage occurring in a power grid, the method comprising:

determining, via a negative sequence regulator programmed in a controller of an electrical power system, a negative sequence component of at least one electrical condition of the electrical power system;

estimating, via the negative sequence regulator, a negative sequence component of a voltage condition in the power grid as a function of the negative sequence component of the electrical condition of the generator and a grid parameter;

determining a desired current response based on the negative sequence component of the voltage condition in the power grid;

determining a predictor current by multiplying the estimated negative sequence component of the voltage condition and a desired negative sequence admittance characteristic of the electrical power system, summing the multiplied value with the desired current response, filtering the summed value via a filter at a predetermined bandwidth, and limiting the filtered value;

determining a current output based on the predictor current; and, determining a modulation index command for the power converter as a function of the current output so as to achieve a desired relationship between the negative sequence component of the voltage condition in the power grid and the negative sequence component of the electrical condition of the electrical power system.

14. The method of claim 13, wherein determining the regulator current further comprises:

applying a gain to an error signal representative of a difference between the desired current response and a measured current response; and, integrating, via an integrator in the negative sequence regulator, the error signal to obtain the regulator current.

15. The method of claim 13, further comprising:

converting the current output to a voltage value;

dividing the voltage value by a DC link voltage from the power converter to obtain the modulation index command; and limiting the modulation index command for the power converter such that the modulation index command maintains relative values of the signal does not cause windup.

* * * * *